US012789288B2

(12) United States Patent
Kimberlin

(10) Patent No.: US 12,789,288 B2
(45) Date of Patent: *Nov. 10, 2026

(54) LIQUID JET LASER TOOL UTILIZING AN OFF-AXIS LASER BEAM

(71) Applicant: Industrial Laser Machines, LLC, Winter Park, FL (US)

(72) Inventor: Dwight Evans Kimberlin, Winter Park, FL (US)

(73) Assignee: INDUSTRIAL LASER MACHINES, LLC, Winter Park, FL (US)

( * ) Notice: Subject to any disclaimer, the term of this patent is extended or adjusted under 35 U.S.C. 154(b) by 657 days.

This patent is subject to a terminal disclaimer.

(21) Appl. No.: 18/201,879

(22) Filed: May 25, 2023

(65) Prior Publication Data

US 2024/0391026 A1 Nov. 28, 2024

(51) Int. Cl.
*B23K 26/06* (2014.01)
*B23K 26/062* (2014.01)
(Continued)

(52) U.S. Cl.
CPC ...... *B23K 26/0665* (2013.01); *B23K 26/0608* (2013.01); *B23K 26/0622* (2015.10);
(Continued)

(58) Field of Classification Search
CPC ................ B23K 26/38; B23K 26/0608; B23K 26/0622; B23K 26/0626; B23K 26/0643;
(Continued)

(56) References Cited

U.S. PATENT DOCUMENTS 5,876,550 A 3/1999 Feygin et al.
11,697,175 B2 * 7/2023 Hippert ................ B23K 26/032 219/121.84

(Continued)

FOREIGN PATENT DOCUMENTS

CN 107662046 A 2/2018

OTHER PUBLICATIONS

Abrate et al, "Machining of composite materials. Part II : Non-traditional methods", Composites manufacturing, Jan. 1, 1992, pp. 85-94, 3(2), ResearchGate, Berlin, Germany.

(Continued)

*Primary Examiner* — Andrew J Marien
(74) *Attorney, Agent, or Firm* — Mark Malek; Widerman Malek, PL

(57) ABSTRACT

Techniques are disclosed for a liquid jet laser tool that employs an off-axis laser beam and a liquid jet stream ejected from a nozzle. The off-axis design allows the beam to be directed into the jet stream from a lateral position at an angle of incidence that causes it to undergo total internal reflection within the jet stream. Any requisite optics are employed to direct the laser beam into the jet stream. The laser beam thus confined in the liquid jet stream arrives at a workpiece. The off-axis design prevents the damage to the nozzle by the laser, and thus minimizes/eliminates the need for its replacement thereby increasing efficiency and reducing operational costs. In embodiments, multiple laser beams are directed into the jet stream that simultaneously undergo total internal reflection to arrive at the workpiece. The multi-laser design accrues benefits including more uniform laser energy, higher peak power, reduced maintenance, etc.

20 Claims, 13 Drawing Sheets

(51) Int. Cl.
*B23K 26/0622* (2014.01)
*B23K 26/064* (2014.01)
*B23K 26/14* (2014.01)
*B23K 26/146* (2014.01)
*B23K 26/38* (2014.01)

(52) U.S. Cl.
CPC ...... *B23K 26/0626* (2013.01); *B23K 26/0643* (2013.01); *B23K 26/146* (2015.10); *B23K 26/1464* (2013.01); *B23K 26/38* (2013.01)

(58) Field of Classification Search
CPC .............. B23K 26/0665; B23K 26/146; B23K 26/1464
See application file for complete search history.

(56) References Cited

U.S. PATENT DOCUMENTS

| | | | | |
|---|---|---|---|---|
| 12,590,025 | B2 * | 3/2026 | Ortner | C03B 33/0222 |
| 2005/0263507 | A1 * | 12/2005 | Yamazaki | B23K 26/1482 219/121.75 |
| 2009/0084765 | A1 * | 4/2009 | Muratsubaki | B23K 26/146 219/121.67 |
| 2011/0042362 | A1 * | 2/2011 | Maehara | B23K 26/142 219/121.67 |
| 2012/0074110 | A1 | 3/2012 | Zediker et al. | |
| 2015/0165559 | A1 * | 6/2015 | Gaebelein | B29D 30/0629 29/402.03 |
| 2016/0318123 | A1 * | 11/2016 | Xue | C21D 10/005 |
| 2017/0182593 | A1 | 6/2017 | Richerzhagen et al. | |
| 2018/0029159 | A1 * | 2/2018 | Toyama | B23K 26/042 |
| 2018/0161928 | A1 * | 6/2018 | Hu | B23K 26/1494 |
| 2020/0398370 | A1 * | 12/2020 | Nomaru | B23K 26/0665 |
| 2023/0064501 | A1 | 3/2023 | Zhang et al. | |

OTHER PUBLICATIONS

Chavoshi et al, “Hybrid Micro-machining Processes: A Review”, Precision Engineering, Jul. 1, 2015, pp. 1-23, 41, Centre for Precision Manufacturing, Department of Design, Manufacture and Engineering Management, University of Strathclyde, Glasgow, UK.
Dong et al, “Research on coupling technology for water-jet guided laser machining based on off-axis optical system”, Infrared and Laser Engineering (www.irla.cn, DOI: 10.3788/IRLA201847.1206001), Jul. 5, 2018, pp. 1206001-1206001, 47(12), Department of Mechanical Engineering, Tsinghua University, Beijing, China.
Gaebelein et al, “Pushing the envelope of liquid-jet guided laser machining applying modern IR fiber lasers”, https://www.avonisys.com (DOI: 10.13140/RG.2.2.35993.88164), May 13, 2019, pp. 1-10, ResearchGate, Berlin, Germany.
Sun et al, “Chapter 2—Laser Beam Machining”, Nontraditional Machining Processes by J. P. Davim (ed.)(DOI: 10.1007/978-1-4471-5179-1_2), Jun. 8, 2013, pp. 35-62, Springer-Verlag, London, UK.

* cited by examiner

LIQUID JET LASER TOOL UTILIZING AN OFF-AXIS LASER BEAM

FIELD OF THE INVENTION

The present invention generally relates to laser machining systems that utilize a laser beam introduced into a liquid jet stream or column. More specifically, the present invention relates to a laser machining tool or system where the laser beam is introduced off-axially into the liquid jet stream/column.

BACKGROUND

Laser liquid-jet or waterjet systems use a liquid or water jet to guide a laser beam to a workpiece for cutting, drilling, or other material processing applications. These laser machining systems use a laser tool or head in which the laser beam is introduced or injected into a liquid or water jet stream or column. The laser beam then travels through the liquid jet stream undergoing total internal reflection as in an optical waveguide or fiber optic. Such laser machining tools have the advantage that the energy of the laser beam across the length of the water jet is concentrated on the cross section of the water jet. Thus, the focal point of the laser beam does not have to be tracked in the spacing between the laser tool and the workpiece. Such systems also have the advantage that the material to be machined can be continuously cooled and removed by the water jet.

U.S. Patent Publication No. 2009/0084765 A1 to Muratsubaki et al. teaches one such laser machining tool or apparatus. Their tool comprises a nozzle for ejecting a jet liquid to a workpiece and a liquid supply unit for supplying the jet liquid to the nozzle, while a laser beam is introduced into a jet liquid column ejected from the nozzle. The laser machining apparatus further comprises a laminar flow forming channel for supplying the jet liquid to the nozzle in a laminar state. The laminar flow forming channel includes a distribution channel formed by a cavity for annually distributing the jet liquid.

The jet liquid is supplied from the liquid supply unit around an axis of the nozzle. There is an interconnecting channel disposed to be communicated with the distribution channel at the downstream side in an axial direction of the nozzle. The channel is formed by an annular cavity around the axis of the nozzle to provide a narrower flow passage than the distribution channel. A liquid reservoir chamber is adjacently disposed upstream of the nozzle in the axial direction and for storing the jet liquid to be supplied to the nozzle. The liquid reservoir chamber has an outer peripheral edge being communicated with the interconnecting channel over an entire circumference of its annular shape.

U.S. Patent Publication No. US 2017/0182593 A1 to Richerzhagen et al. discloses a machining head for coupling a laser beam into a liquid jet. The machining head comprises an optical unit having at least one optical element for focusing the laser beam, and a coupling unit having a liquid chamber that is delimited by a wall, wherein a nozzle having a nozzle opening for generating a liquid jet is disposed in the wall. In a state in which the coupling unit is connected to the optical unit, the laser beam that is capable of being focused by the optical unit is directable in a beam direction through the liquid chamber of the coupling unit into the nozzle opening, and is capable of being coupled into the liquid jet that is generatable by the nozzle and runs in the beam.

For the liquid chamber to be supplied with liquid from the optical unit, a liquid interface is formed between the optical unit and the coupling unit, wherein, in the state in which the coupling unit is connected to the optical unit, the liquid interface, when viewed in the beam direction, is disposed ahead of that optical element of the optical unit that is last in the beam direction.

U.S. Patent Publication No. 2012/0074110 A1 to Zediker et al. teaches high power laser systems, apparatus and methods for performing laser operations. In particular, these systems are used in environments where an optically obstructive medium may be present in the laser beam path, such as within the borehole of an oil, gas or geothermal well, or below the surface of a body of water. Further, they teach systems, apparatus and methods that manage potentially damaging back reflections that may be generated during such laser operations. The high-power laser operations would include tasks, such as, window cutting, pipe cutting and other workover completion activities, as well as decommissioning, plugging and abandonment tasks.

In the prior art laser machining tools and systems, such as the ones mentioned above, the laser beam is focused through a protective window onto or into the waterjet on-axis through the waterjet nozzle. FIG. 1 shows a cross-sectional view of such a typical on-axis laser tool 10 of the prior art employing a liquid jet stream. There is a laser beam 12 shown by the dotted line that is first transmitted through a focusing lens 14 and then through a protective window 16. There is also a water supply or inlets 20 for ejecting water through a water nozzle 22 and thus producing a waterjet stream 24.

Laser beam 12, now contained in waterjet 24 due to total internal reflection and shown by the dotted line marked by reference numeral 12', travels to a workpiece 30 for machining purposes. FIG. 2 shows a three-dimensional (3D) left-isometric view of the prior art system of FIG. 1 with corresponding reference numerals of various elements as shown. Note, that laser beam 12' of FIG. 1 contained in liquid jet 24 is not explicitly marked in FIG. 2 for clarity, but is presumed to exist.

In some prior art systems, an appropriate gas is utilized to increase the stability and the length of the collimation of liquid jet being ejected from nozzle 22. A cross-sectional view of such a prior art system 20 as a variation of system 10 of FIG. 1 is shown in FIG. 3. In comparison to FIG. 1, there is now a gas supply or inlets 42 and a gas nozzle 44 through which a shielding gas is ejected. The ejected gas forms a gas shielding 46 that maintains and increases the stability of waterjet 24 arriving at workpiece 30 and containing totally internally reflected laser beam 12'.

The prior art systems including the ones discussed above suffer from a number of limitations. Most importantly, the on-axis design of the typical prior art laser tools, such as those of FIG. 1-3 above, results in severely limiting the amount of laser energy that can be delivered to workpiece 30 without damaging nozzle 22. In the prior art systems, there is a trade-off between the peak energy of the laser that can be used and the frequency at which nozzle 22 needs to be replaced. If the peak energy is too high, the nozzle gets damaged or shattered immediately. The nozzle must also be made from expensive materials including diamond or sapphire or the lifetime of the nozzle becomes impractically short. Another limitation of such prior art systems is that if laser beam 12 utilizes pulsed laser, then pulse widths need to be long in order to reduce the peak energy per pulse of laser beam 12.

OBJECTS OF THE INVENTION

In view of the shortcomings of the prior art, it is an object of the invention to provide techniques for an off-axis liquid jet laser tool by having a laser beam that is off-axis or lateral to the liquid jet stream.

It is also an object of the invention to prevent laser energy from damaging the liquid nozzle of the instant liquid jet laser tool.

It is also an object of the invention to place the laser beams in a manner that their angles of incidence with the liquid jet stream will cause them to undergo total internal reflection within the liquid jet stream.

It is further an object of the invention to utilize various optics to focus the laser beam onto/into the liquid jet stream.

It is also an object of the invention to use a bending mirror to reflect the laser beam onto the liquid jet stream.

It is further an object of the invention to use multiple laser beams directed onto/into the liquid jet stream. The multiple laser beams may have the same or differing wavelengths.

It is also an object of the invention to utilize an annular mirror that reflects the multiple laser beams onto/into the liquid jet stream.

It is also an object of the invention to minimize interface reflections and interface refractions of the laser beam at its interface or intersection with the liquid jet stream.

It is also an object of the invention to use a shielding gas to protect the stability and collimation of the liquid jet stream.

It is further an object of the invention to utilize a single laser source and a beam splitter to produce multiple laser beams that are then directed onto the liquid jet stream.

Still other objects and advantages of the invention will become apparent upon reading the summary and the detailed description in conjunction with the drawing figures.

SUMMARY OF THE INVENTION

A number of objects and advantages of the invention are achieved by apparatus and methods for an off-axis liquid jet laser tool or an off-axis laser beam injection system that employs a liquid jet stream and an off-axis laser beam. The liquid jet stream is created by passing an appropriate liquid under pressure through a liquid nozzle that causes the liquid to eject as a jet. Due to the structure of the nozzle, namely its "throat", the ejected liquid jet is collimated or has a columnar shape/form. Hence the ejected liquid jet is referred to as the liquid jet stream of the present disclosure.

By have an off-axis laser beam we mean that the laser beam does not have the same axis as the liquid jet itself or the liquid nozzle through which the liquid is ejected. This is a key distinction of the present design over the prior art. The off-axis laser beam then preferably passes through one or more optics or optical components to be directed onto or introduced into or injected into the liquid jet stream. The angle of incidence of the off-axis laser beam is such that it causes total internal reflection of the laser beam within the liquid jet stream.

Hence, the liquid jet stream travels through or transmits through or is guided by the liquid jet stream to arrive at a workpiece with enough laser energy that allows it to perform any number of functions. Exemplary functions or applications of the present off-axis liquid jet laser tool or more simply the instant laser tool include but are not limited to, machining, milling, cutting, drilling, welding, shaping, etc.

In the preferred embodiment, the liquid employed is water. However, it can be any other liquid that is transmissive enough to allow the specific wavelength(s) of laser light employed in the laser beam to travel through the liquid and still arrive at the workpiece with sufficient functional power. In embodiments that employ water for the liquid jet stream, the optimum angle of incidence with which a laser beam containing laser light of wavelength 532 nano meters should intersect with the jet stream is 62.1 degrees. However, this angle of incidence can be in the range from a value greater than 48.6 degrees up to 62.1 degrees. The angle of incidence of a laser beam is measured as its angle with the normal at its point of intersection with the liquid jet stream.

In a set of highly preferred embodiments, more than one laser beams of the same or differing/different wavelengths strike or intersect with the liquid jet stream to simultaneously undergo total internal reflection in it. This is accomplished by radially distributing the laser beams around the liquid jet stream and employing any requisite types and number of focusing and reflecting optics that focus and direct each laser beam onto/into the liquid jet stream. Exemplary optics include focusing lenses and mirrors. The present embodiments thus combine energies of multiple laser beams resulting in a more uniform distribution of laser energy. This results in improved machining or milling or cutting or drilling efficiency, greater energy efficiency and increased processing speed or throughput than otherwise possible using prior art techniques.

In a related set of variations of the above multi-laser embodiments, a single annular mirror is used that reflects multiple laser beams into the liquid jet stream. The annular mirror of the present multi-laser embodiments can take a variety of forms. In one variation it is a "straight-faced" or straight mirror. In another variation, it is a curved mirror. In still another variation, the single annular mirror is a multi-faced mirror.

The multi-laser embodiments preferably employ a modular design where each laser beam along with its laser source is housed in a laser module or housing. The number of such laser modules is configurable according to the needs of an application. Individual laser modules may thus be added, removed, replaced and repaired as needed in such a modular multi-laser design, thus reducing downtime and increasing versatility of the present technology.

In related variations, instead of or in addition to individual laser sources, a beam splitter or any beam splitting optics are used to split one laser beam into multiple laser beams. The laser beams utilized in the multi-laser embodiments may be produced by any combination of individual laser sources and beam splitters. For instance, it is possible to use a beam splitter to produce two laser beams, while still employing individual sources for three other laser beams.

In another highly desirable set of embodiments, a shielding gas is employed that stabilizes the liquid jet stream and increases its length of collimation. This is accomplished by flowing an appropriate shielding gas through a gas nozzle. The shielding gas thus ejected from the gas nozzle forms a circumferential shielding around the liquid jet stream, causing it to remain stable for a longer distance to the workpiece than otherwise possible. Gas shielding may be employed with various embodiments of the present technology, including single laser beam embodiments and multiple laser beams (or multi-laser) embodiments.

Another set of preferred embodiments employ a control system to control the one or more laser beams. Such a design is especially useful in multi-laser embodiments discussed above. The control system is used for coordinating the operation of the multiple laser beams. The control system may be configured to adjust the power, pulse width, timing, and/or repetition rate of each laser beam individually or in unison, optimizing the machining/milling/cutting/drilling process for different materials or processing conditions. Such a control system is implemented by utilizing control systems, electronic design and computer technologies in a manner that allows it to be easily configured or programmed according to the needs of a given application.

The systems and apparatus of instant off-axis liquid jet laser tool or off-axis laser beam injection system or simply a laser tool comprise a liquid jet stream ejected from a first nozzle and directed towards a workpiece, one or more laser beams introduced into said liquid jet stream from respective positions that are off-axis to said first nozzle, wherein said one or more laser beams undergo total internal reflection in said liquid jet stream to arrive at said workpiece.

The methods of instant off-axis liquid jet laser tool or off-axis laser beam injection system or simply a laser tool comprise the steps of generating a liquid jet stream from a nozzle, introducing one or more laser beams into said liquid jet stream from respective positions that are off-axis to said liquid jet stream and cause said one or more laser beams to undergo total internal reflection in said liquid jet stream, and directing said liquid jet stream containing said one or more laser beams to a workpiece.

Clearly, the system and methods of the invention find many advantageous embodiments. The details of the invention, including its preferred embodiments, are presented in the below detailed description with reference to the appended drawing figures.

BRIEF DESCRIPTION OF THE DRAWING FIGURES

Figure 4:
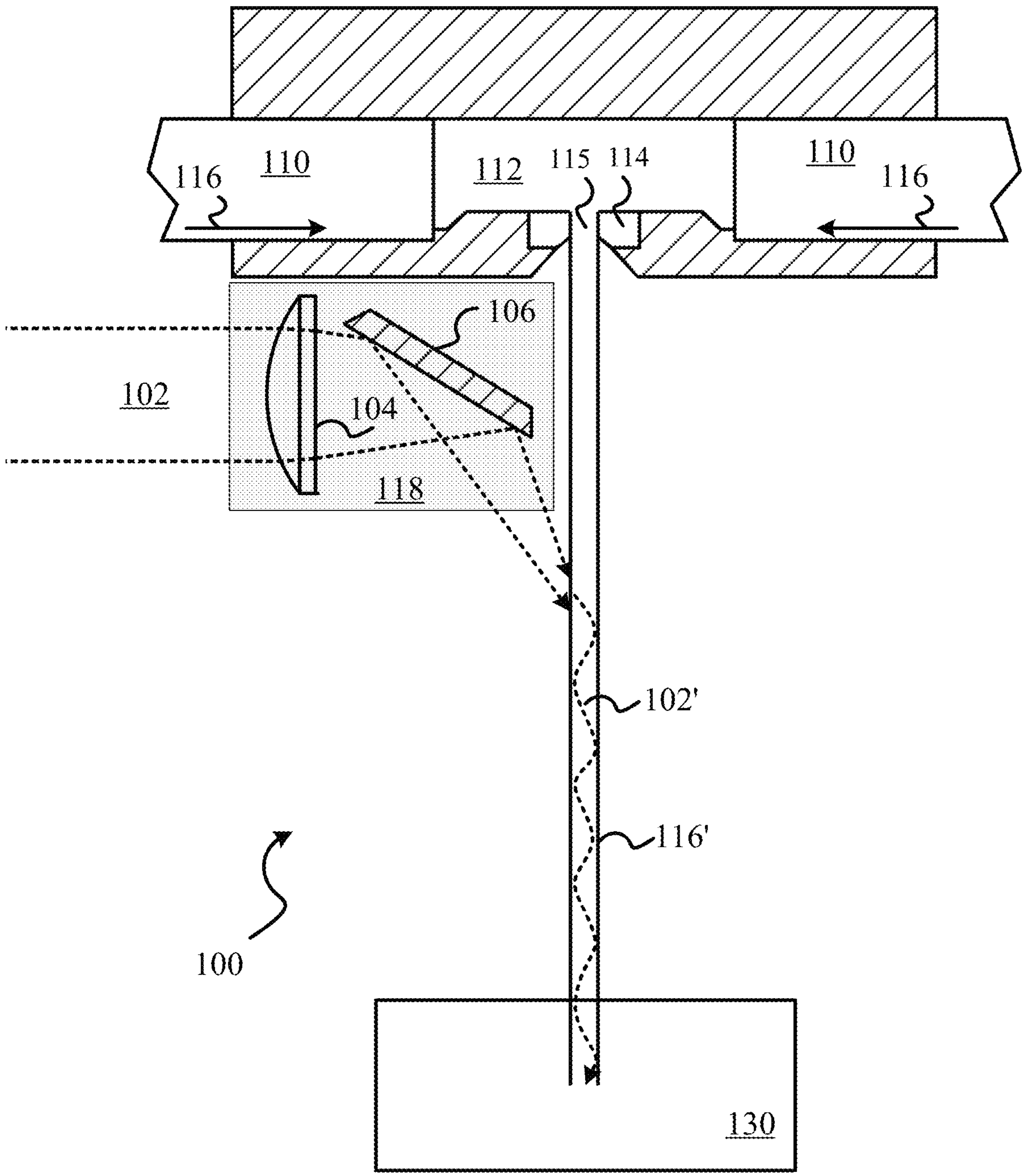
FIG. 4 shows an off-axis liquid jet laser tool based on the present principles that utilizes a laser beam that is off-axis/off-axial to the liquid jet stream.
Figure 12:
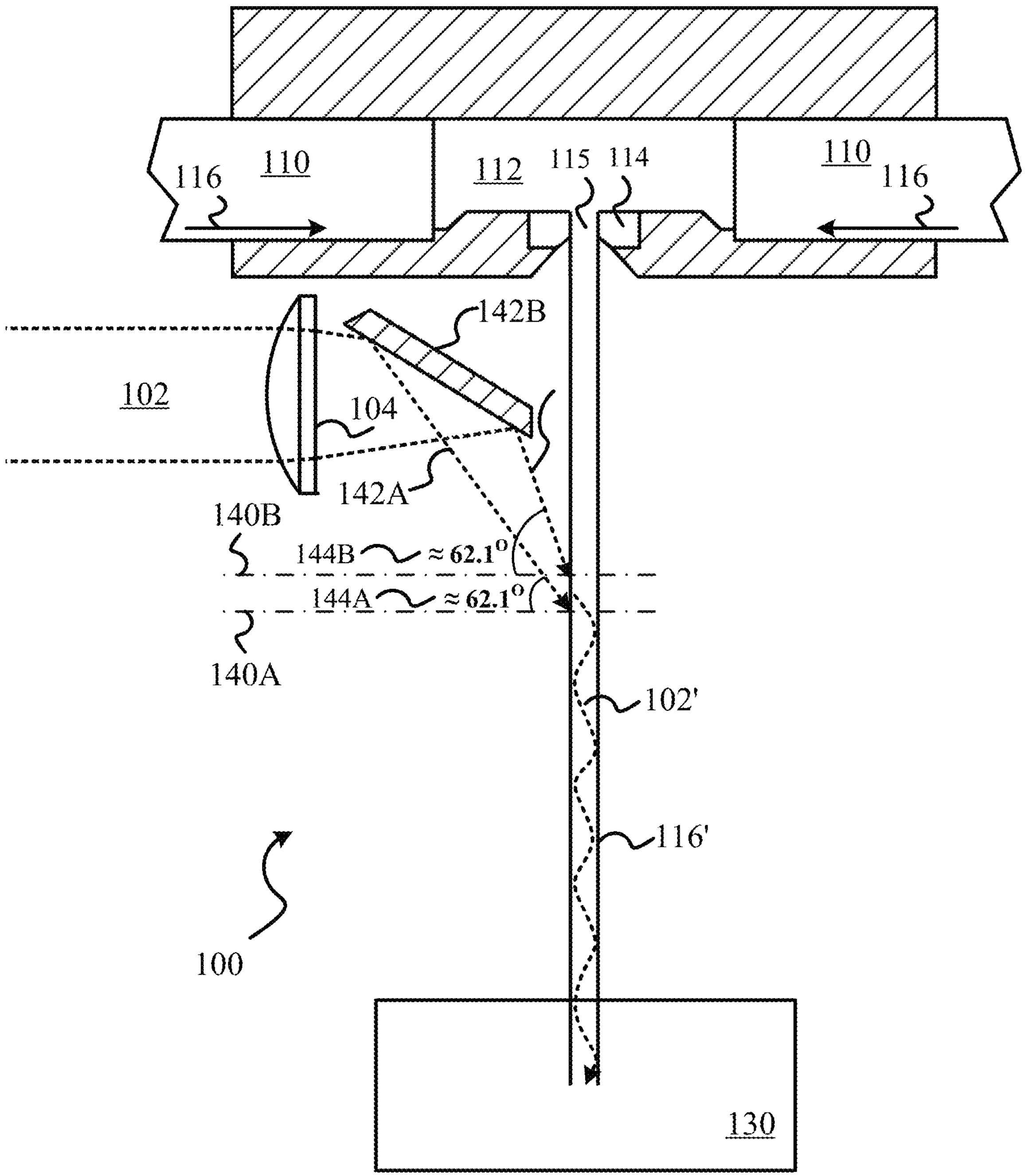

FIG. 12 utilizes the embodiment of FIG. 4 to illustrate how the angle of incidence of the laser beams with respect to the liquid jet stream is measured.

Figure 13:
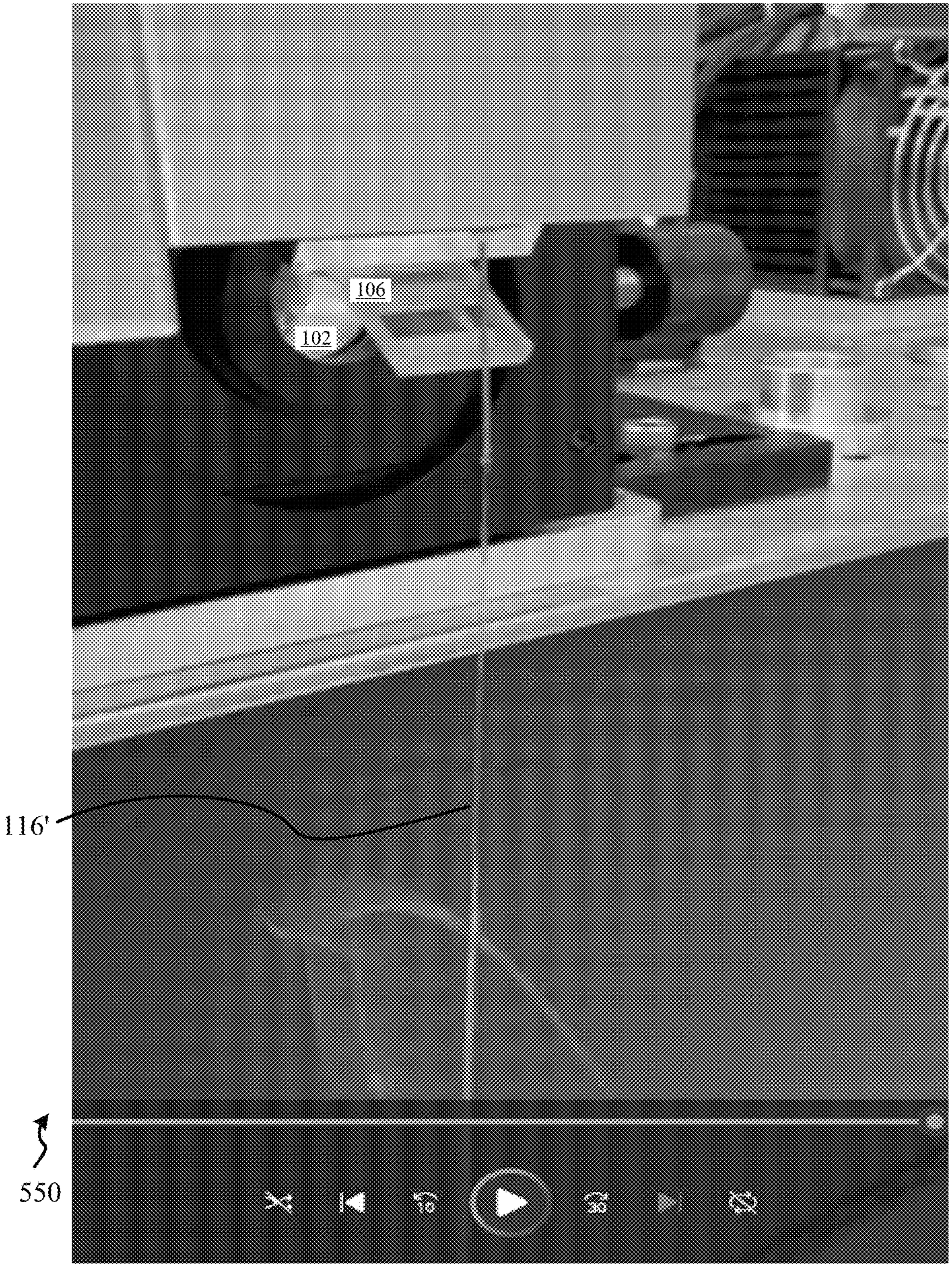

FIG. 13 is an image from an exemplary implementation of the present technology showing the laser beam, bending mirror and the total internal reflection of the laser beam in the liquid jet stream.

DETAILED DESCRIPTION

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable, similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Let us now review the techniques for an off-axis liquid jet laser tool based on the present principles as shown in FIG. 4. FIG. 4 shows a cross-sectional view of an instant off-axis liquid jet laser machining tool or a liquid jet laser tool or an off-axis laser beam injection system or simply a laser tool 100. The machinery that instant liquid jet laser tool 100 is connected to or attached to or is a part of, includes but is not limited to milling machines, lathes, cutting equipment, drilling equipment, shaping equipment, etc.

The machinery that utilizes our instant liquid jet laser tool, such as tool 100 of FIG. 4, depends on the application of the present technology and is not explicitly shown in the drawing figures in order not to detract from the principles being taught. Similarly, the fiber optic cables or other transmission media used to transport laser beams to the instant tools/systems is also not shown in order to maintain focus on the present teachings. The present design is agnostic to the various applications in which it is deployed and the means of supply of its requisite jet stream liquid and laser energy.

Referring now to FIG. 4, instant liquid jet laser tool 100 utilizes a liquid 116 that is flown via liquid supply or inlets 110 and into a liquid reservoir 112. Now liquid reservoir or chamber 112 has a liquid nozzle or simply nozzle 114 out of which liquid 116 ejects under pressure as a jet and travels in a liquid jet stream or a liquid jet column or simply a jet stream or a liquid jet 116' to workpiece 130. Of course, by the term liquid nozzle we mean that the nozzle is meant for liquid 116 to eject through, and not that the nozzle is made out of a liquid material. In practical terms, the instant nozzle is made out of a suitably hard material including metal, plastic, etc.

Figure 1:
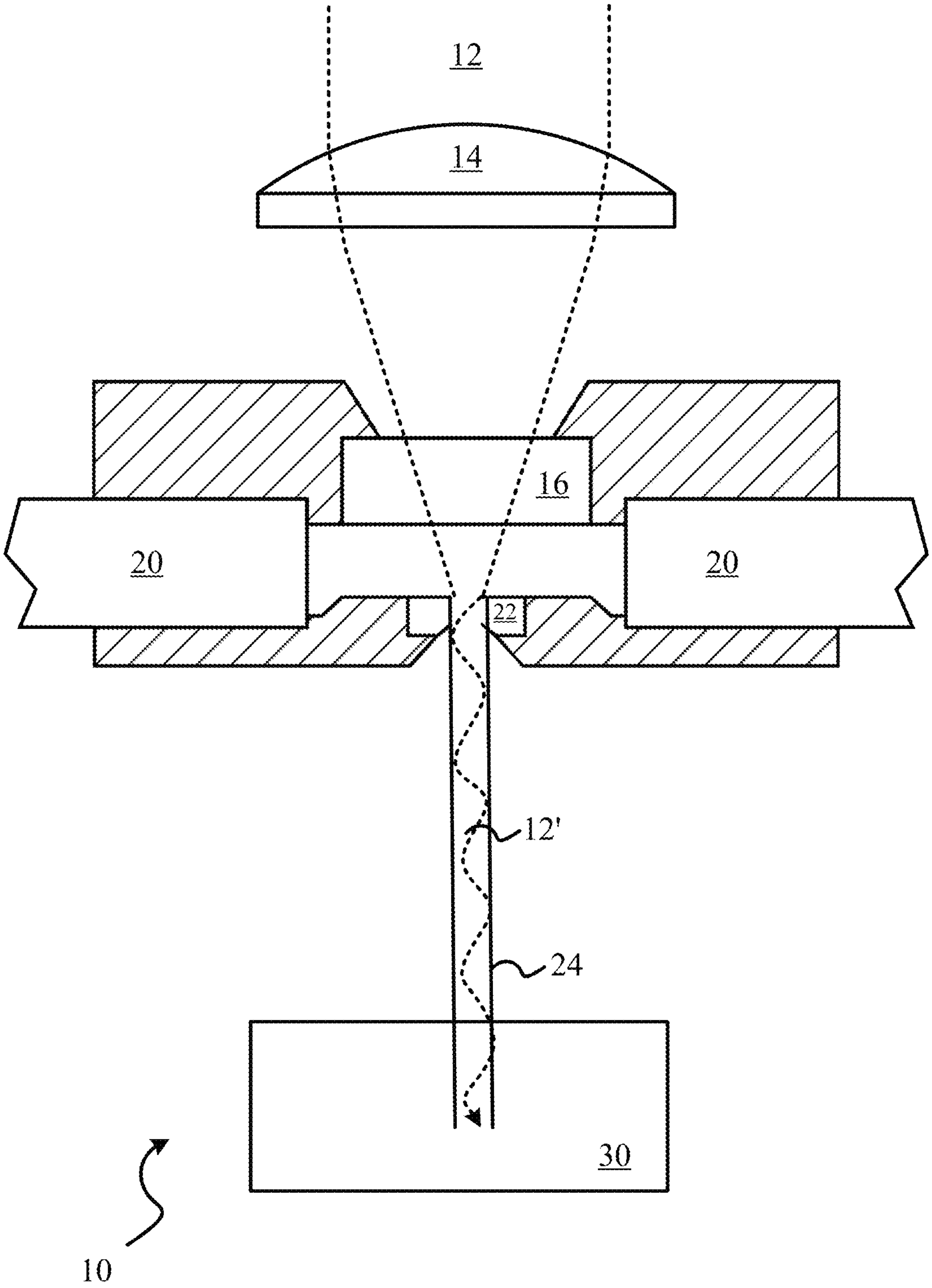
Fig. 1 (Prior Art)
FIG. 1 shows a typical on-axis water jet or waterjet laser tool of the prior art. Note that the laser beam and the water jet stream are co-axial.
Figure 2:
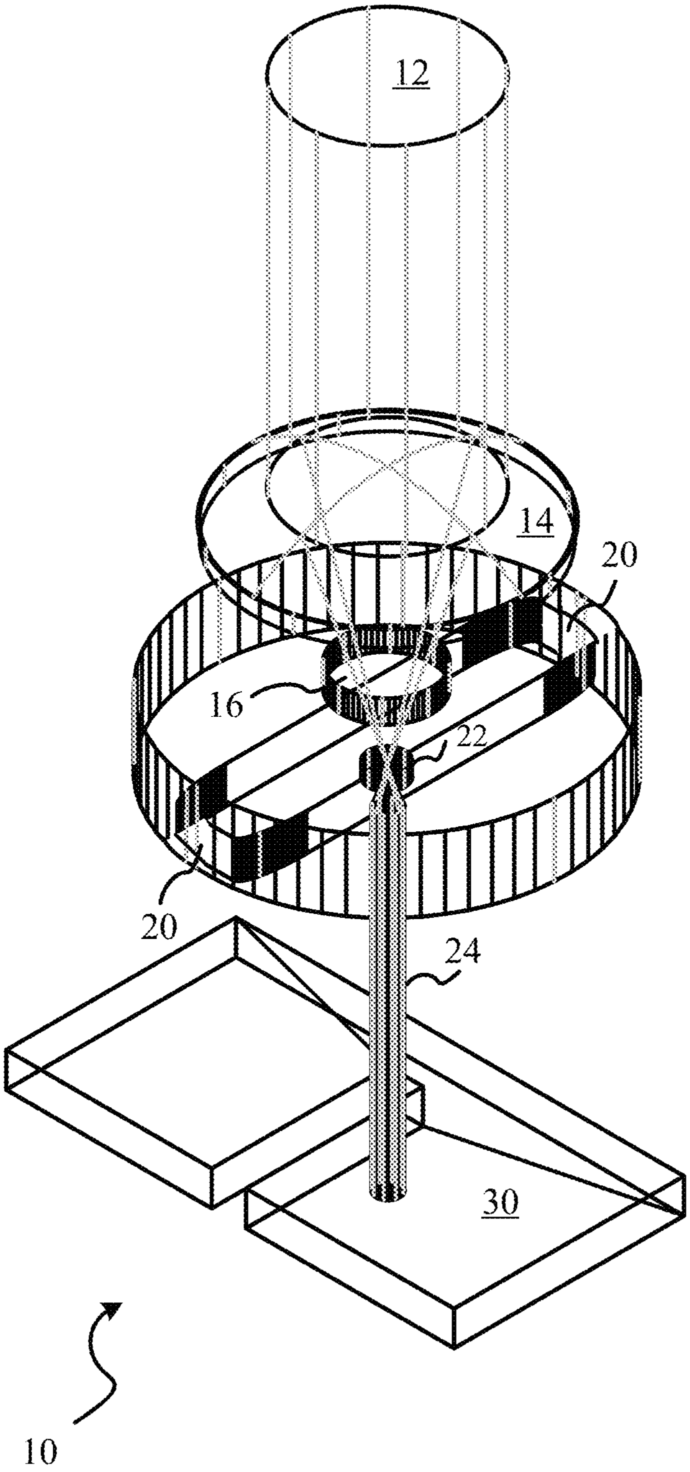
Fig. 2 (Prior Art)
FIG. 2 is a three-dimensional (3D) left-isometric view of the prior art laser tool of FIG. 1.
Figure 3:
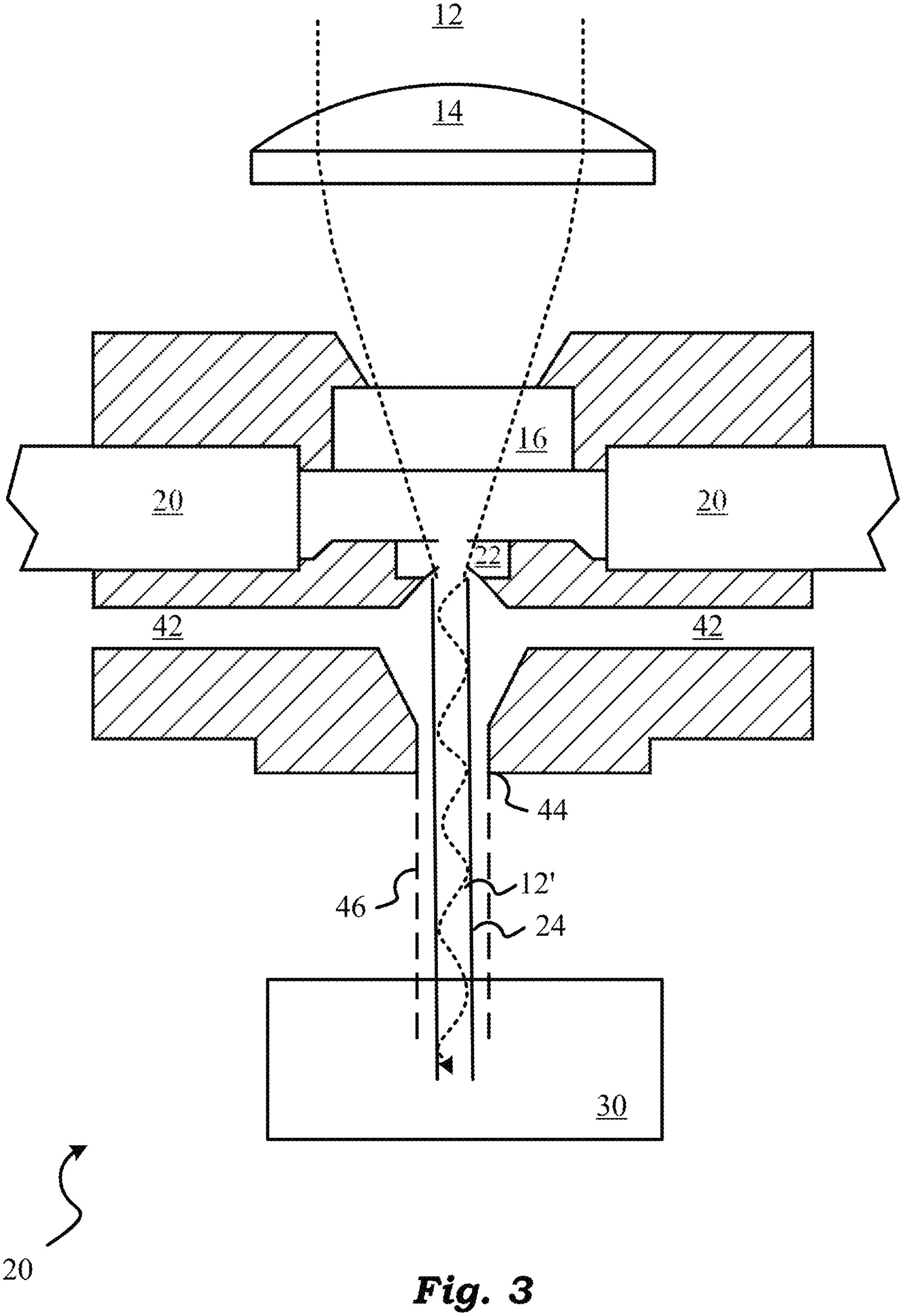
Fig. 3 (Prior Art)
FIG. 3 shows a typical on-axis waterjet laser tool of the prior art that uses gas shielding. Note that the laser beam and the water jet stream are co-axial.

As a result of a "throat" or "neck" 115 of liquid nozzle 114, ejected liquid jet stream 116' is collimated or is in a columnar form as shown. In contrast to the prior art laser tools of FIG. 1-3 discussed above, or any other prevailing art, there is a laser beam 102 shown by the dotted line that is off-axis to/with liquid nozzle 114 and to liquid jet stream 116'. This off-axis/off-axial or off-centered or lateral or sideways or non-aligned/unaligned placement of the instant laser beam(s) with respect to the liquid jet stream and to the nozzle, in the various embodiments taught in this disclosure is a key contribution of the present design.

Thus, the laser beam 102 of FIG. 4 is directed onto or into the liquid jet stream from a position that is to a side of or is lateral to liquid jet stream 116' and laser tool 100 as shown in FIG. 4. Oftentimes, we may refer to the phenomenon of laser beam 102 intersecting with liquid jet stream 116' as laser beam 102 being introduced into or injected into liquid jet stream 116'.

In various preferred embodiments, there are also one or more optical elements that assist in directing and focusing laser beam 102 onto/into liquid jet stream or liquid jet column 116'. In one such preferred embodiment, there is a bending mirror that directs/reflects incident laser beam 102 onto liquid jet stream 116'. In the same or related embodiment, there is also a focusing lens that focuses laser beam 102 onto its point of intersection with or introduction into or injection into liquid jet stream 116'. FIG. 4 show such a preferred embodiment utilizing a focusing lens 104 and a bending mirror 106 to direct and focus laser beam 102 onto liquid jet stream 116'. Bending mirror 106 may be a flat mirror.

Alternatively, bending mirror 106 may be a curved or concave mirror that further focuses the laser light onto water jet 116'. For this purpose, an appropriate shape for the concave mirror may be employed. The shape of mirror 106 is chosen in concert with the shape and focusing properties of lens 104 so together the optics or optical components 104 and 106 can focus the laser light onto jet stream 116'. Possible concave shapes for mirror 106 in such alternative embodiments include spherical and hyperboloidal shapes among others.

Regardless, laser beam 102 intersects with liquid jet stream 116' at an angle of incidence (taught further below) that is appropriate to cause it to undergo total internal reflection within liquid jet stream 116'. Such a totally internally reflected laser beam originating as laser beam 102 is shown by reference numeral 102' in FIG. 4. Laser beam 102' is now confined in or contained in or guided by jet stream 116' until it arrives at workpiece 130.

In various preferred embodiments, liquid 116 used in liquid jet laser tool 100 or in other liquid jet laser tools taught in this disclosure, is water. As such, liquid jet stream 116' may be referred to as water jet stream or waterjet stream or simply waterjet 116'. However, any appropriate liquid instead of water may be employed. Such an appropriate liquid should be transmissive enough for the specific wavelength(s) of laser light used in laser beam 102 for delivering sufficient laser energy to workpiece 130.

Because laser beam 102 is off-axis to liquid jet 116' and to nozzle 114, the present is able to overcome many limitations of the prior art. As a first advantage over the prior art techniques including those taught in reference to FIG. 1-3 above, since nozzle 114 is not in the path of laser beam 102, it avoids being damaged and ablated by the laser. That means that we can use a lot more powerful laser with much higher peak and average energies than the prior techniques would allow. This is a key contribution of the current technology over the prior art. In other words, we can use a much higher peak and average power for laser beam 102 without damaging nozzle 114 and having to replace it frequently.

Replacing the damaged nozzle as needed in the prior art requires shutting down the laser tool and incurring downtime, which ultimately results higher cost of production and/or operation. The current technology as exemplarily implemented in embodiment 100 of FIG. 4 avoids these difficulties because instant nozzle 112 is no longer subjected to the damaging effects of laser beam 102. Furthermore, nozzle 112 can now be constructed from less costly materials and do not require diamond or sapphire to endure the laser. This further lowers the cost of production and is another contribution of the present design over the prior art.

Figure 5:
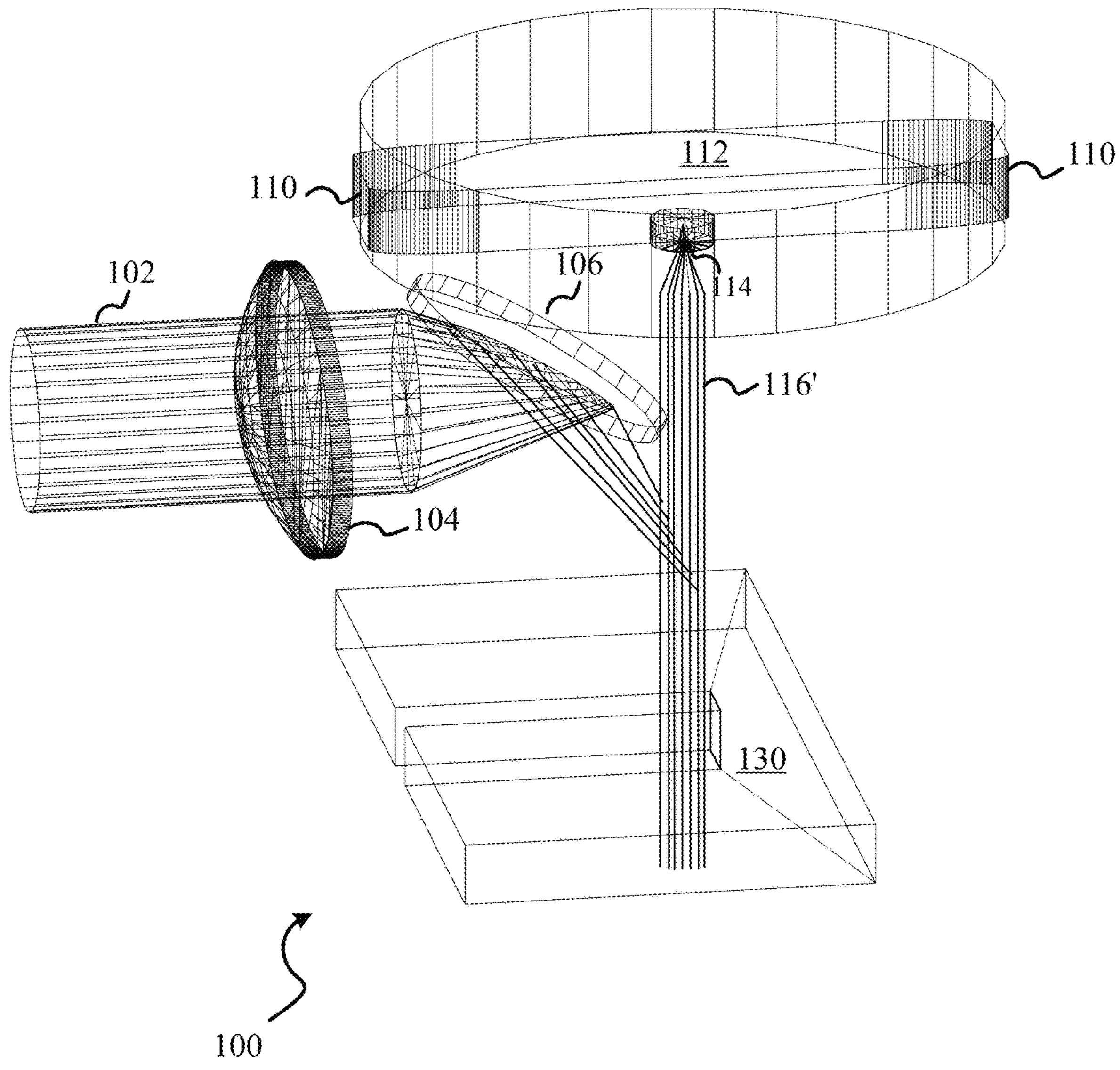
FIG. 5 is a 3D custom view of the embodiment shown in FIG. 4.

Depending on the application of instant laser tool 100, there may also be additional housing for the optical components that shields them from splashes of liquid 116 or other environmental hazards. An exemplary protective housing 118 for our optical components i.e. focusing lens 104 and bending mirror 106 is shown by a the gray-shaded box. Housing 118 is preferably positively pressurized to discourage contamination of the optics within the housing from environmental factors, including liquid splashes, workpiece debris, etc. FIG. 5 shows a custom 3D view of embodiment 100 of our instant laser tool of FIG. 4 with corresponding elements marked as applicable. Not all elements from FIG. 4 are marked in FIG. 5 to avoid clutter.

Figure 6:
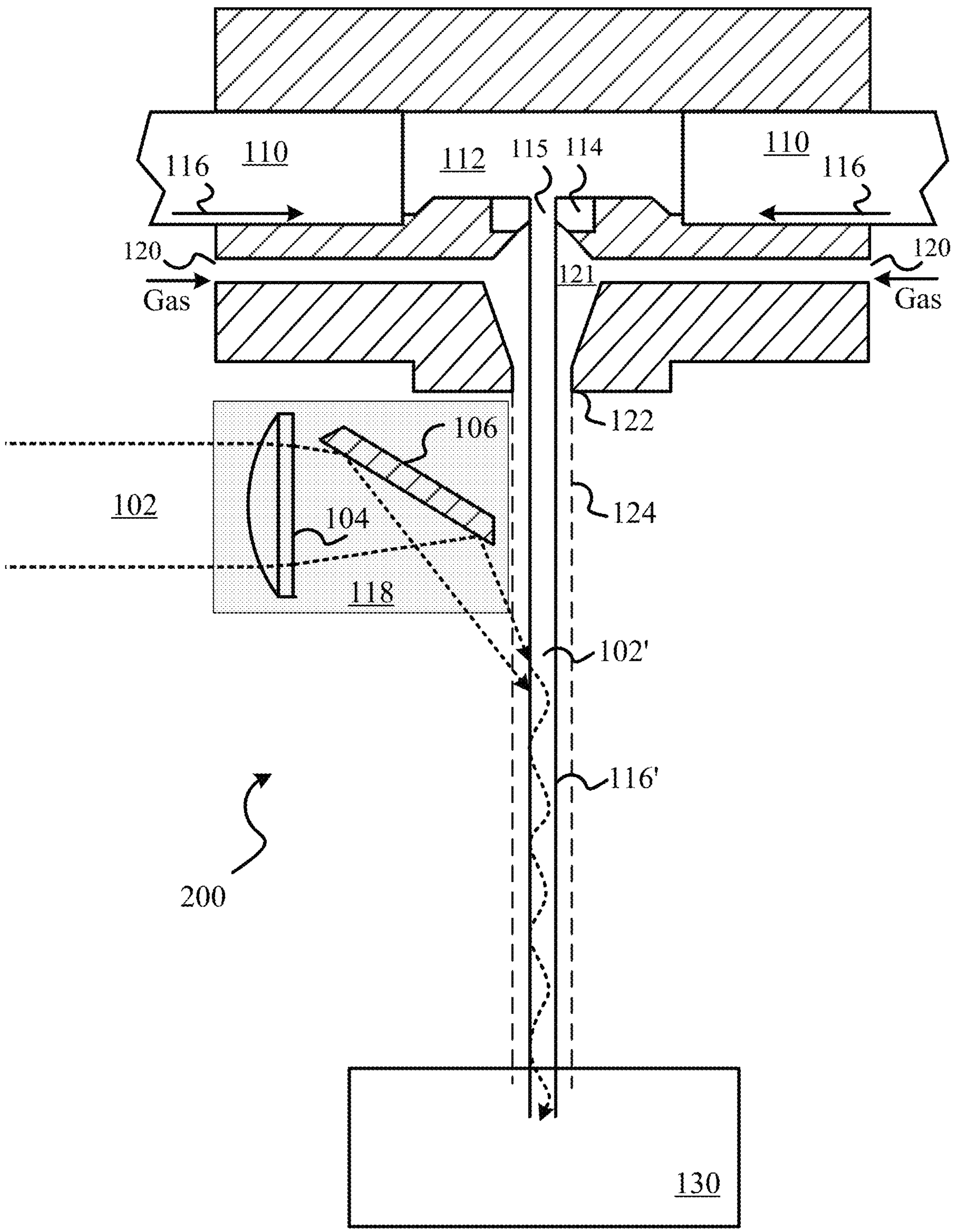
FIG. 6 shows a variation of the embodiment of FIG. 4-5 where gas shielding is employed to stabilize the liquid jet stream.

In another embodiment, gas is used to prolong and sustain the collimation of the ejected liquid jet stream as it approaches the workpiece. Such an embodiment 200 of our instant liquid jet laser tool or off-axis laser beam injection system is shown in FIG. 6. Embodiment 200 of FIG. 6 is a variation of the embodiment 100 of FIG. 4-5 where same reference numerals are used to mark the various elements of the embodiments as practicable. However, in a distinction from embodiment 100, embodiment 200 utilizes gas supply or inlets 120 as shown.

An appropriate shielding gas 121 available in the industry, presently or in the future, is flown through inlets 120. Gas 121 then ejects through a gas nozzle 122 and forms a gas shielding 124 circumferentially around jet stream 116' as shown in FIG. 6. This arrangement prolongs the stability and collimation of liquid jet stream 116' for a longer distance to workpiece 130 than otherwise possible.

Gas shielding 124 in embodiment 200 of FIG. 6 accrues a number of advantages including protection against oxidation of workpiece material. This is because typically shielding gas 121 is an inert gas such as argon or nitrogen that creates a protective atmosphere around laser-machine or laser-cutting zone on workpiece 130. Other advantages of gas shielding 124 include but are not limited to minimization of dross formation, cooling and conduction, assistance in removal of molten material, etc. Now, gas shielding accrues these benefits in traditional "dry" laser processing systems also i.e. those without a waterjet. However, employing a waterjet enhances these benefits while also reducing or eliminating surface deposition as compared to the dry laser processing systems.

Embodiment 200 of FIG. 6 finds a variety of useful applications where low operational cost and high throughput are important. This is because, just like embodiment 100 of FIG. 4-5, liquid nozzle 114 is not damaged by laser 102, can be constructed out of lower-cost materials and does not need to be frequently replaced. Per present teachings, these benefits are accrued in the present design as a result of the off-axis or lateral placement of laser beam 102 with respect to nozzle 114 and to liquid jet stream 116'.

Figure 7:
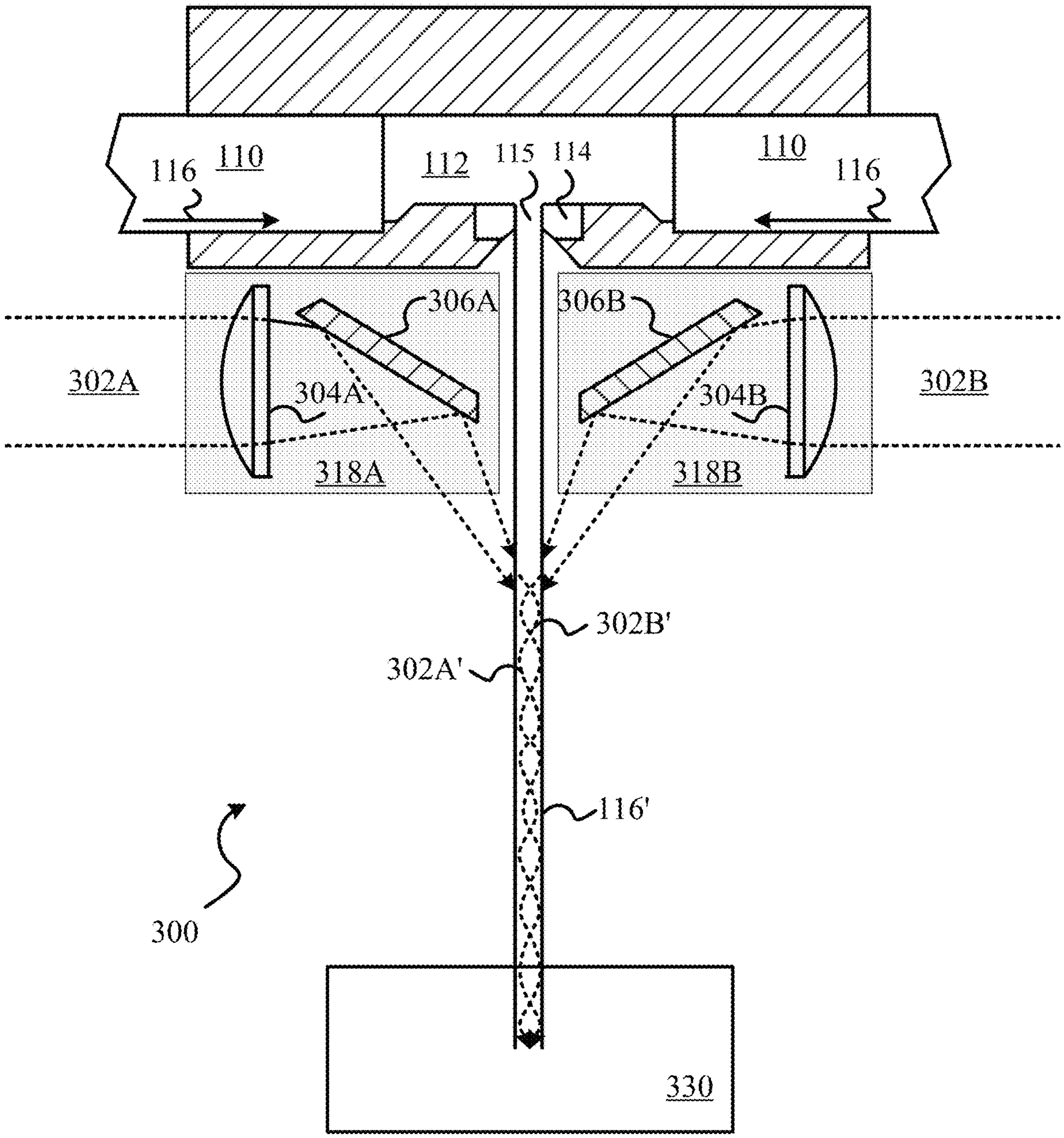
FIG. 7 shows a highly useful embodiment of the present technology that employs multiple laser beams.

Let us now review another set of highly desirable embodiments of the present technology that employ multiple laser beams. FIG. 7 shows one such embodiment 300 with multiple laser beams 302A, 302B, . . . shown by dotted lines along with respective optical components i.e. lens 304A, 304B, . . . and bending mirrors 306A, 306B, . . . respectively. Focusing lenses 304 and bending mirrors 306 are carefully aligned and stable to ensure that each respective laser beam 302 enters the water jet at the correct angle.

Note that FIG. 7 shows only two laser beams 102A-B and respective optical components 104A-B and 106A-B for clarity. However, any number of such laser beams 302 respective optical components 302 and 304 may exist and be off-axially or radially or circumferentially or laterally distributed around liquid jet stream 116'. Furthermore, it is also possible that laser beams 302 are employed with or without focusing lenses 302 and/or bending mirrors 304 per present teachings.

To understand this further, let us consider some variations conceived within the scope of the present principles by taking advantage of FIG. 7. These variations are described below but for brevity, not explicitly shown in the drawing figures as they are readily conceivable from FIG. 7. In a first such conceivable variation of FIG. 7, a laser beam exists that is refracted by a focusing lens and is positioned in such a manner that it is directed at an appropriate angle of incidence with or onto liquid jet stream 116'. The angle of incidence causes its total internal reflection within jet stream 116', without requiring a bending mirror. In other words, the laser beam is refracted by the focusing lens directly onto/into liquid jet stream 116', while not requiring a bending mirror. This is because of the proper placement of the laser beam and the focusing lens. A potential location/placement of the laser beam and the lens in such a variation are above liquid nozzle 114 but still off-axis to it.

In another such variation conceived from FIG. 7 but not explicitly shown for brevity, a laser beam is not transmitted through a focusing lens, but is still reflected by a bending mirror. In the same or related conceivable variation of FIG. 7 not explicitly shown for brevity, the bending mirror is a concave mirror that focuses and reflects a laser beam into/onto liquid jet stream 116'. Any other permutations of the various optical components as needed to cause total internal reflection of off-axis or lateral laser beams of the present design are conceivable.

Returning now to embodiment 300 explicitly shown in FIG. 7, each housing 318A, 318B, . . . may constitute a self-contained module with its own laser source for producing corresponding laser beams 302A, 302B, . . . . Alternatively, the number of independent laser sources may be less than the laser modules, and one or more beam splitters or beam splitting optics are employed to generate laser beams for respective number of modules. As familiar to skilled artisans, a beam splitter splits a single laser beam into multiple laser beams. Each such resultant laser beam has less power than the incident beam.

As in the prior embodiments, any of housings 318 may be pressurized to further protect their respective optical components. Regardless, the use of multiple laser beams in the instant off-axis liquid jet laser tools/systems or simply instant laser tools/systems offers several advantages over conventional single-beam laser waterjet systems. These include but are not limited to more uniform distribution of laser energy, improved machining or milling or cutting or drilling efficiency, greater versatility, greater energy efficiency and increased processing speed or throughput, than otherwise possible.

Depending on the application of the present embodiments, the multiple laser beams may contain laser light of the same or differing wavelengths. Moreover, individual laser beams with laser light of different wavelengths may then be activated and deactivated at different times as needed. Alternatively, multiple wavelengths may be activated simultaneously and combined within the liquid jet. Furthermore, the laser sources generating the multiple laser beams may all be continuous wave (CW) lasers, pulsed lasers or any combination thereof. In short, by introducing multiple laser beams into the jet stream, the system can achieve improved performance, more flexibility, greater energy efficiency, and increased processing speed, among other benefits.

Referring still to FIG. 7, housings 318 or respective laser modules are placed circumferentially or radially around liquid jet 116'. Laser modules 318 are endowed with optical components 304 and 306 as needed. As a result, multiple laser beams 302 are directed onto/into liquid jet stream 116' where they undergo total internal reflection in it to arrive at workpiece 330. Two such exemplary totally internally reflected laser beams 302A' and 302B' originating as respective laser beams 302A and 302B are explicitly shown within liquid jet stream 116' in FIG. 7.

As a result of the design of the present embodiments, a lot more laser energy and possibly from multiple different types of laser sources can be combined to be delivered to workpiece 130. These multi-laser embodiments thus enable a variety of applications that may not otherwise be possible by embodiments employing a single laser beam. Preferably, the laser modules, e.g. laser modules/housings 318 of FIG. 7, can be added, replaced or configured according to the needs of a given application. As a result, the ability to adapt the number of laser beams and control their operation provides a highly versatile and customizable machining/cutting/drilling system, suitable for a wide range of applications.

Figure 8:
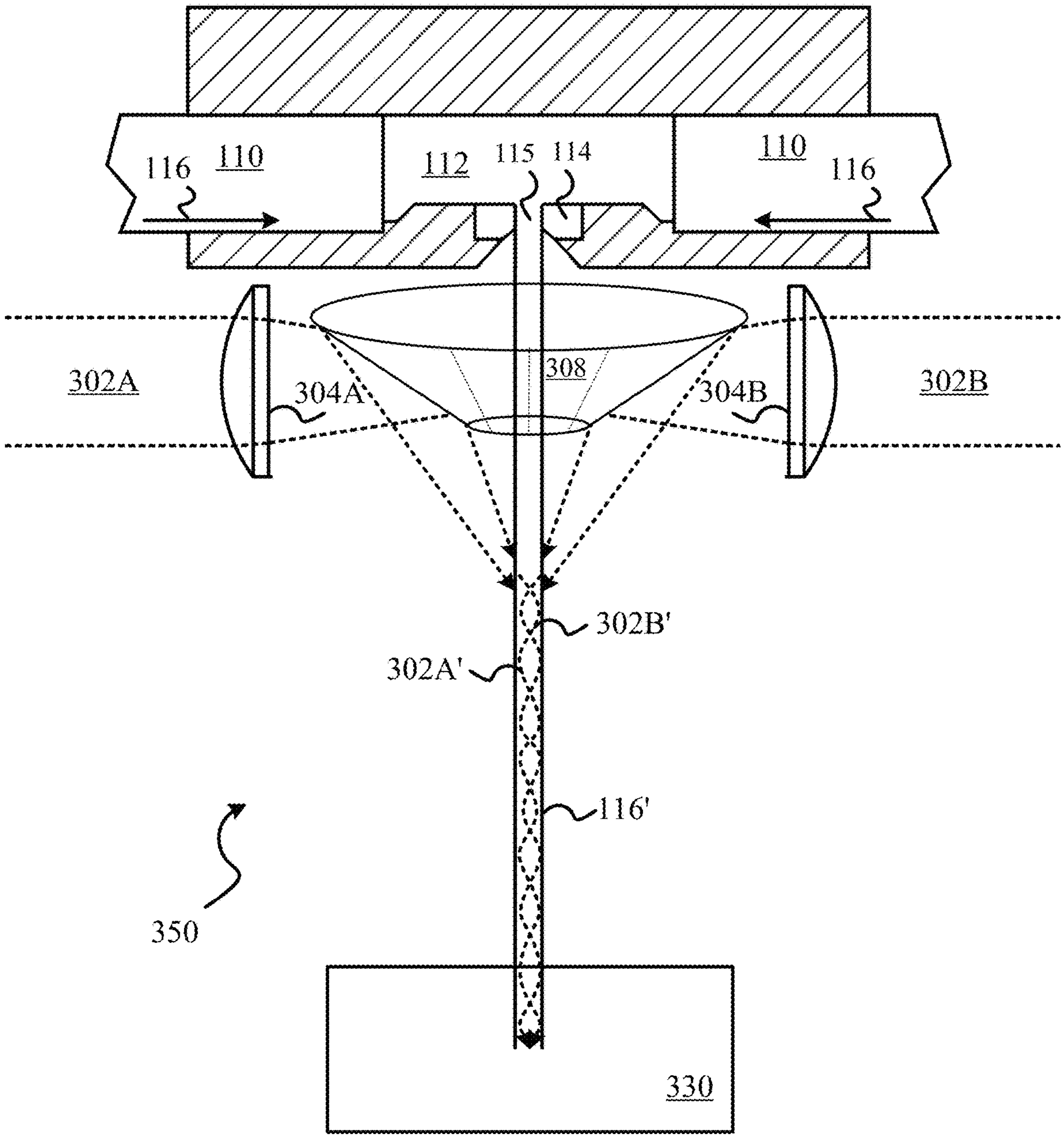
FIG. 8 shows a highly useful variation of the multi-laser embodiment of FIG. 7 that employs a single annular mirror. The embodiment shown in FIG. 8 employs a straight annular mirror.

In a highly useful related variations of the present multi-laser embodiments, instead of multiple bending mirrors 306A, 306B, . . . of FIG. 7, a single annular mirror is used. The annular mirror is circumferentially placed in a 360° manner around liquid jet stream 116'. Such an embodiment 350 is shown in FIG. 8. In comparison, to embodiment 300 of FIG. 7, bending mirrors 306A, 306B, . . . are replaced by a single annular mirror 308 as shown. Laser beams 302A-B or any number of laser beams 302 are arranged in an off-axis or lateral manner to liquid jet stream 116' and to nozzle 114.

The annular mirror configuration of the present embodiments not only overcomes the limitations of conventional systems in the area peak energy and nozzle damage but also provides a more versatile machining/cutting/drilling solution suitable for a wide range of applications. As shown in FIG. 8, laser light from laser beams 302 is directed onto annular mirror 308 such that it is incident at an angle onto liquid jet stream 116' that is appropriate/correct to cause it to undergo total internal reflection within jet stream 116'. The computation of such an angle of incidence or acceptance of laser beams 302 is provided further below in this disclosure. For clarity FIG. 8 does not show individual housings 318 from FIG. 7 and which depending on the variation may or may not exist.

Figure 9:
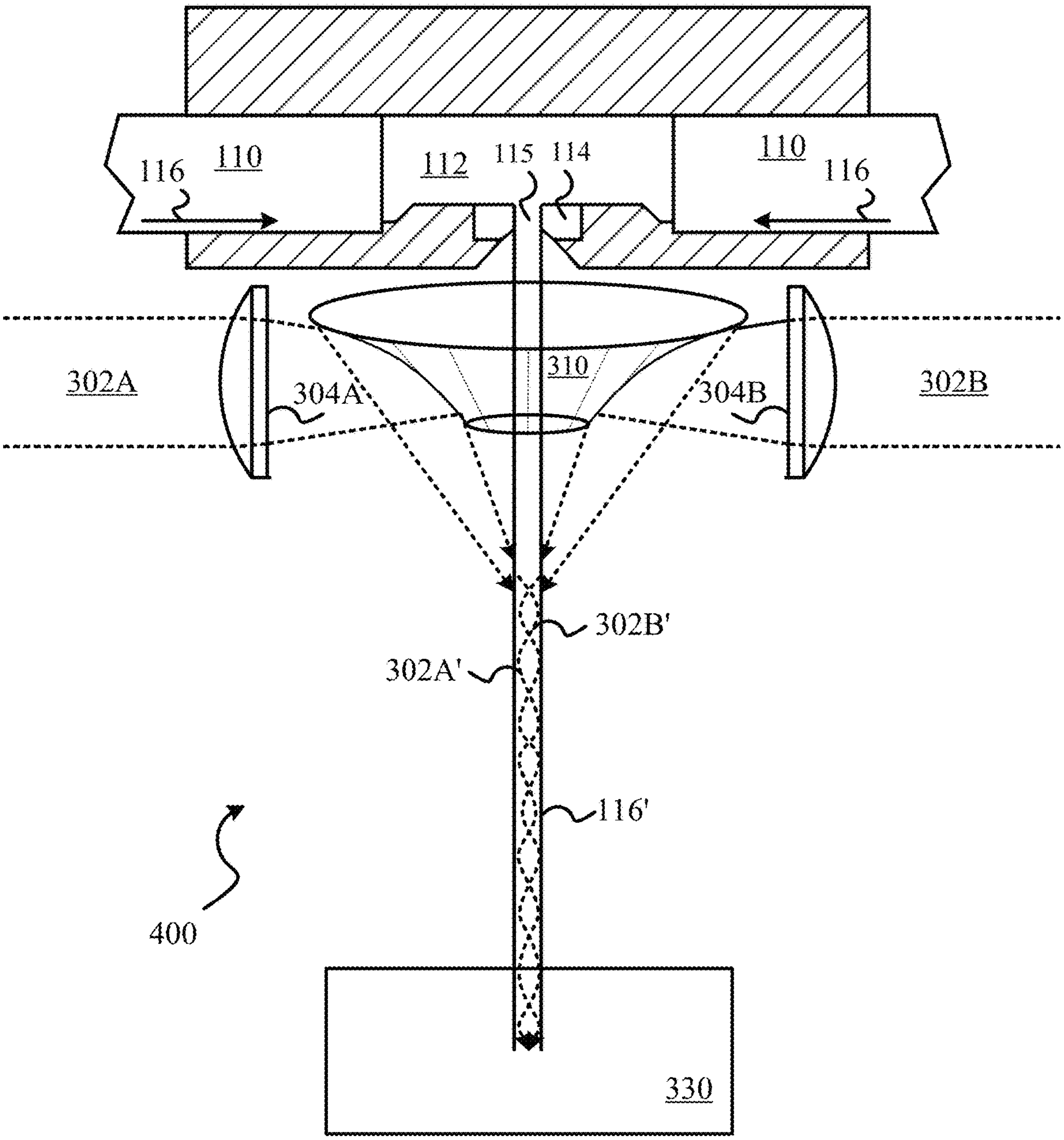
FIG. 9 shows a variation of the multi-laser embodiment of FIG. 8 that employs a curved annular mirror.

Again, two laser beams 302A, 302B and respective focusing lenses 304A, 304B are shown in FIG. 8 for clarity, but any number of these may exist according to the application of embodiment 350. The example of FIG. 8 shows annular mirror 308 as a single "straight-faced" or simply a straight annular/circumferential mirror. However, FIG. 9 shows a variation 400 where instead of straight-faced annular mirror 308, a curved or hyperboloidal annular mirror 310 is used. The curvature of mirror 310 is chosen such that the angle of incidence of reflected laser beams 302 is within the acceptance range that would cause them to under total internal reflection in liquid jet stream 116' per present teachings.

Figure 10:
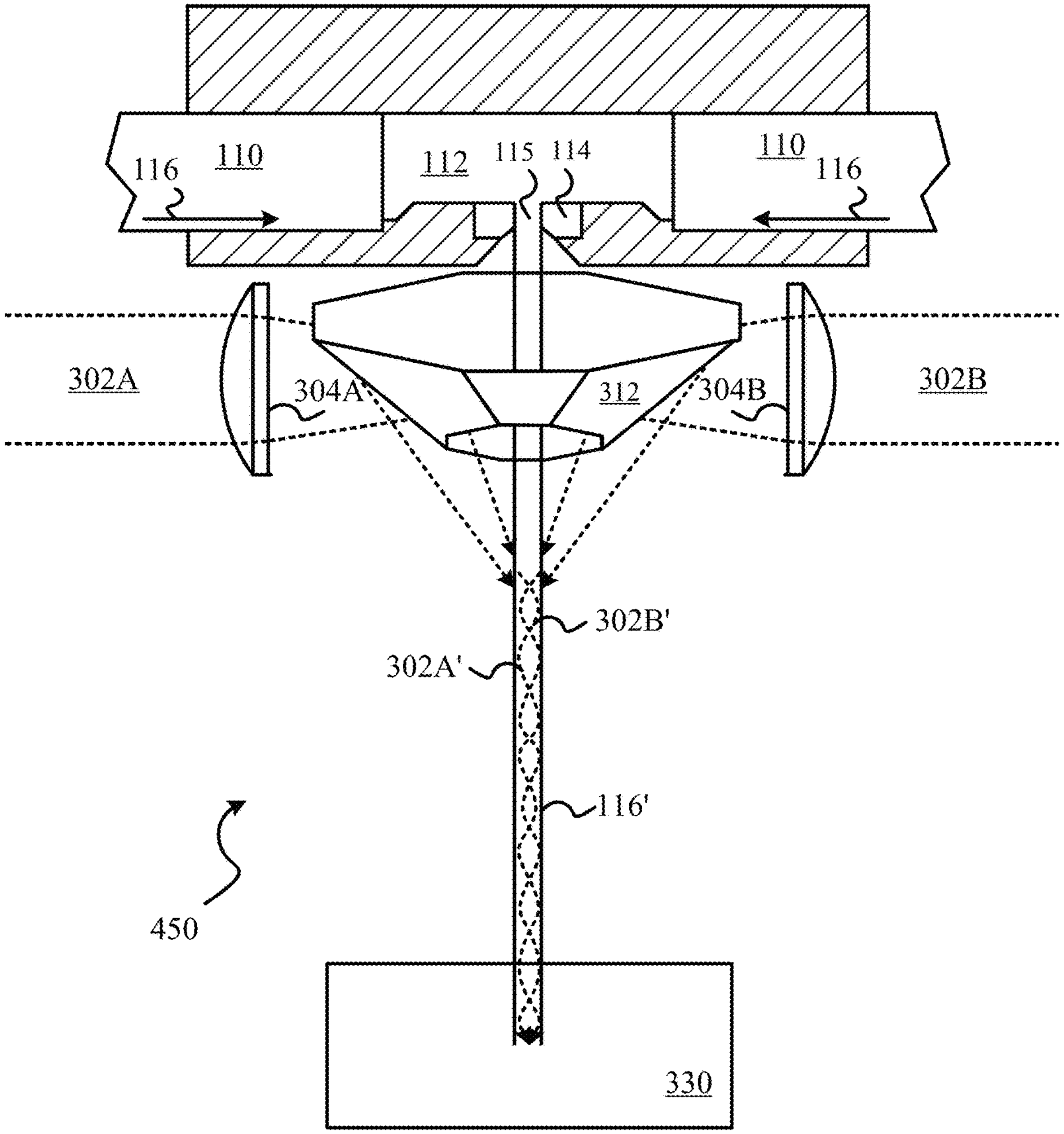
FIG. 10 shows a variation of the multi-laser embodiments of FIG. 8-9 that employs a multi-faceted annular mirror.

FIG. 10 shows yet another variation 450 of the present multi-laser embodiments of our instant laser tool that utilizes an annular mirror. In embodiment 450, annular mirror 312 is multi-faceted. In such a multi-faceted arrangement, there may be an equal number or less of laser modules of the above teachings, each projecting a laser beam 302 onto a facet or face of our multi-faceted mirror 312. There may also be equal number or less of intervening focusing lenses 304 as desired. FIG. 10 does not explicitly show optional housings 318 of the above teachings for clarity, and which may be present if needed by an application of laser tool 450 of FIG. 10.

Figure 11:
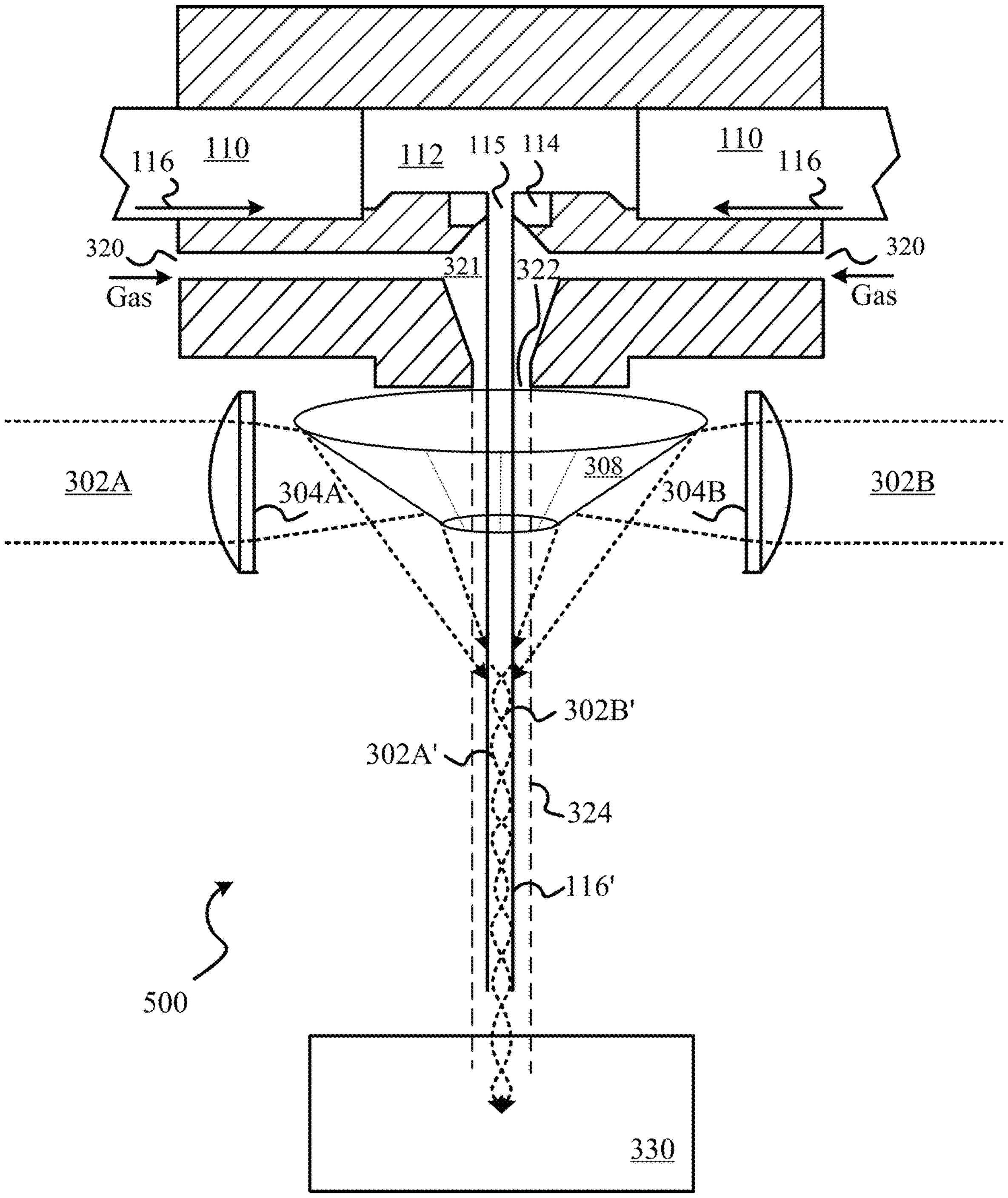
FIG. 11 shows a variation of the multi-laser embodiment of FIG. 8 that employs gas shielding to stabilize the liquid jet stream or column.

Any of the above multi-laser embodiments of FIG. 7-10 may take advantage of a shielding gas to further stabilize and prolong the collimation of liquid jet stream 116'. One such embodiment 500 is shown in FIG. 11 as a variation of liquid jet laser tool or off-axis laser beam injection system 350 of FIG. 8. More specifically, FIG. 11 shows gas inlets 320 through which an appropriate shielding gas 321 is flown. The gas ejects/escapes through gas nozzle 322 around liquid jet stream 116' and forms a gas shielding 324.

Consequently, gas shielding 324 confines liquid jet stream or column 324 to a uniform columnar form. This increases its collimation length and its ability to reach workpiece 330 along with laser beams 302 without turbulence or deterioration or fluctuations of the jet stream. This consequently increases the machining performance of the system and reduces the risk of energy loss. Further, embodiment 500 also achieves the benefits of utilizing a shielding gas as taught in reference to embodiment 200 of FIG. 6 above, and which also accrues the shielding benefits mentioned above in reference to FIG. 11.

Calculation/Computation of the Angle of Incidence of the Laser Beam

Let us now calculate the accepted angle of incidence that laser beams 102 and 302 of our embodiments described earlier in reference to FIG. 4-11 need to meet in order to cause them to undergo total internal reflection inside liquid jet stream 116'. In order to accomplish that, let us first find the minimum angle of incidence that would allow the incident laser light to undergo total internal reflection. This minimum angle is referred to as the critical angle.

The angle of incidence is the angle between laser beams 102 and 302 with respect to the respective imaginary normal lines to the surface of water jet stream 116' at the points of intersection between the laser beams and the jet stream. This angle is measured in the medium where the light is coming from, in our case, air.

For the present computations, let us exemplarily assume that we are using a laser beam with a 532 nano meter wavelength. However, the following computations can be easily adapted to laser light of any wavelength. Let us further assume that liquid 116 employed for creating liquid jet stream 116' is water.

The core of jet stream 116' or simply liquid jet stream 116' is surrounded by air cladding as in the embodiments of FIG. 4-5 and FIG. 7-10. As such, the angle of incidence must be greater than the critical angle for the air-water interface. However, in the gas shielded embodiments of FIG. 6 and FIG. 11, the angle of incidence of the laser beams need to be greater than the critical angle of the interface of the shielding gas with water.

The following computations determine the critical angle for the air-water interface for the embodiments of FIG. 4-5 and FIG. 7-10. Depending on specific shielding gas 121, 321 employed for the gas shielded embodiments of FIG. 6 and FIG. 11, they can be easily adapted for corresponding gas-water interface.

The critical angle for our air-water interface can be calculated using Snell's Law:

$$\sin(\theta c) = n2/n1$$

where θc is the critical angle, n1 is the refractive index of the medium with the higher refractive index (water in this case), and n2 is the refractive index of the medium with the lower refractive index (air in this case).

The refractive index of water at 532 nm is approximately 1.333, and the refractive index of air is approximately 1.0003. Therefore, $$\sin(\theta c) = 1.0003/1.333$$

$$\theta c = \arcsin(1.0003/1.333)$$

$$\theta c \approx 48.6 \text{ degrees}$$

To maintain total internal reflection, the angle of incidence must be greater than the critical angle, which is approximately 48.6 degrees. Note however, that the values utilized and computed above are approximate, as the refractive indices can vary slightly depending on the specific conditions e.g., temperature, pressure, impurities in the air and water, etc.

In order to find the maximum angle of incidence that the laser beam can enter the water jet from the air outside and still maintain total internal reflection once inside, we need to consider the refraction that occurs at the air-water interface.

Let θ1 be the angle of incidence in air and θ2 be the angle of refraction in water. According to Snell's Law:

$$n1 * \sin(\theta 1) = n2 * \sin(\theta 2)$$

We already know the refractive indices for air (n1≈1.0003) and water (n2≈1.333) at 532 nm, and we have found the critical angle for total internal reflection at the air-water interface above (θc≈48.6 degrees).

Now we want to find the maximum θ1 that will result in θ2 being equal to the critical angle. Using Snell's Law:

$$1.0003 * \sin(\theta 1) = 1.333 * \sin(48.6°)$$

Solving for θ1:

$$\theta 1 = \arcsin(1.333 * \sin(48.6°)/1.0003)$$

$$\theta 1 \approx 62.1 \text{ degrees}$$

Therefore, the maximum angle at which the laser beam can enter the water jet from the air outside and still maintain total internal reflection once inside the water jet stream, is approximately 62.1 degrees. Note however that these values are approximate, as the refractive indices can vary slightly depending on the specific conditions e.g., temperature, pressure, impurities in the air and water, etc.

The percentage of a laser beams 102, 302 that reflects off water jet stream 116' and the percentage that enters water jet stream 116' depends on the angle of incidence and the polarization of the light. Fresnel equations can be used to calculate the reflectance (the fraction of the incident power that is reflected) and transmittance (the fraction of incident power that is transmitted).

To facilitate explanation, let us assume that the laser beam is unpolarized, which means it has equal components of s-polarized (perpendicular to the plane of incidence) and p-polarized (parallel to the plane of incidence) light.

The Fresnel reflection coefficients for s- and p-polarized light can be calculated as:

$$Rs = \left|(n1*\cos(\theta 1) - n2*\cos(\theta 2))/(n1*\cos(\theta 1) + n2*\cos(\theta 2))\right|\verb|^|2 Rp = \left|(n1*\cos(\theta 2) - n2*\cos(\theta 1))/(n1*\cos(\theta 2) + n*\cos(\theta 1))\right|\verb|^|2$$

The reflectance R for unpolarized light is the average of the s- and p-polarized components:

$$R = (Rs + Rp)/2$$

The transmittance T can be calculated as:

$$T = 1 - R$$

Assuming the angle of incidence θ1 is 62.1 degrees (the maximum angle we found above), we can calculate the reflectance and transmittance. First, we need to find the angle of refraction θ2 using Snell's Law:

$$\sin(\theta 2) = (n1/n2)*\sin(\theta 1)\theta 2 = \arcsin((1.0003/1.333)*\sin(62.1°)) \approx 44.6 \text{ degrees}$$

Now we can calculate the Fresnel coefficients:

$$Rs \approx 0.0253\ Rp \approx 0.0135$$

The reflectance R for unpolarized light:

$$R \approx (0.0253 + 0.0135)/2 \approx 0.0194$$

The transmittance T:

$$T \approx 1 - 0.0194 \approx 0.9806$$

So, approximately 1.94% of the laser beam will reflect off the water jet stream 116', and 98.06% will enter the water jet. These values are for the specific angle of incidence (62.1 degrees) and can vary depending on the angle and the specific conditions e.g., temperature, pressure, impurities in the air and water, etc.

If the laser beam is s-polarized, we can use the Fresnel reflection coefficient for s-polarized light (Rs) to calculate the reflectance and transmittance. We have already found the angle of incidence (θ1=62.1°) and the angle of refraction (θ2≈44.6°) above.

The Fresnel reflection coefficient for s-polarized light is:

$$Rs = \left|(n1*\cos(\theta 1) - n2*\cos(\theta 2))/(n1*\cos(\theta 1) + n2*\cos(\theta 2))\right|\verb|^|2$$

Using the refractive indices for air (n1≈1.0003) and water (n2≈1.333) and the calculated angles:

$$Rs \approx 0.0253$$

The reflectance R for s-polarized light is equal to Rs:

$$R = Rs \approx 0.0253$$

The transmittance T can be calculated as:

$$T = 1 - R \approx 1 - 0.0253 \approx 0.9747$$

So, for an s-polarized laser beam at an angle of incidence of 62.1 degrees, approximately 2.53% of the laser beam will reflect off water jet stream 116', and 97.47% will enter the water jet. Again, these values can vary depending on the angle and the specific conditions e.g., temperature, pressure, impurities in the air and water, etc.

If the laser beam is p-polarized, we can use the Fresnel reflection coefficient for p-polarized light (Rp) to calculate the reflectance and transmittance. We have already found the angle of incidence (θ1=62.1°) and the angle of refraction (θ2≈44.6°) above.

The Fresnel reflection coefficient for p-polarized light is:

$$Rp = \left|(n1*\cos(\theta 2) - n2*\cos(\theta 1))/(n1*\cos(\theta 2) + n2*\cos(\theta 1))\right|\verb|^|2$$

Using the refractive indices for air (n1≈1.0003) and water (n2≈1.333) and the calculated angles:

$$Rp \approx 0.0135$$

The reflectance R for p-polarized light is equal to Rp:

$$R = Rp \approx 0.0135$$

The transmittance T can be calculated as:

$$T = 1 - R \approx 1 - 0.0135 \approx 0.9865$$

So, for a p-polarized laser beam at an angle of incidence of 62.1 degrees, approximately 1.35% of the laser beam will reflect off water jet stream 116', and 98.65% will enter the water jet. These values can vary depending on the angle and the specific conditions, e.g., temperature, pressure, impurities. etc.

Therefore, for a laser beam to enter a water jet stream from the air outside and still maintain total internal reflection once inside the water jet stream, the maximum angle of incidence (with respect to the normal) is approximately 62.1 degrees, as we have calculated above.

However, we want to minimize reflection at the air-water interface. Therefore, we should consider the different polarizations:

1. For unpolarized light and s-polarized light, reflection increases as the angle of incidence increases. Therefore, while the angle must be larger than the critical angle (48.6 degrees after refraction) to maintain total internal reflection, increasing it further will lead to more reflection. So, the optimal angle is likely close to the maximum angle that still allows for total internal reflection, which is about 62.1 degrees.
2. For p-polarized light, reflection decreases as the angle of incidence increases, reaches a minimum at Brewster's angle (~53.1 degrees), and then starts increasing again. However, Brewster's angle does not allow for total internal reflection. As with the other polarizations, the angle must be larger than the critical angle to maintain total internal reflection. So once again, the optimal angle is likely close to the maximum angle that still allows for total internal reflection, which is about 62.1 degrees.

In conclusion, in all three cases (unpolarized, s-polarized, and p-polarized light), the optimum angle of incidence from the air outside water jet stream 116' of the embodiments of FIG. 4-5 and FIG. 7-10 in order to maintain total internal reflection while minimizing reflection is approximately 62.1 degrees. Furthermore, the range of acceptance or the acceptance range for the angle of incidence is from a value greater than 48.6 degrees up to 62.1 degrees. We may refer to this range as the acceptance angle for the incident laser beams.

FIG. 12 depicts embodiment 100 of FIG. 4 discussed earlier. However, in addition to the elements of FIG. 4, FIG. 12 explicitly shows how the angle of incidence of laser beam 102 with respect to water jet 116' is measured. More specifically, FIG. 12 shows dotted and dashed imaginary normal lines 140A and 140B where two outer rays 142A and 142B of our laser beam 102 intersect with or introduce into or inject into water jet 116' as shown. Also shown are respective angles of incidence 144A and 144B for rays 142A and 142B. Therefore, the minimum values of angles 142A and 142B is the critical angle 48.6° computed above, while their optimum value is 62.1° also computed above and as shown in FIG. 12.

Any of the embodiments taught above or conceived within the present principles may employ any type of suitable laser source or laser sources that generate the off-axis laser beams of the present design. Thus, depending on the embodiments and the needs of an application, the type of laser sources that laser beams 102 and 302 of the above embodiments may employ include but are not limited to gas lasers, solid-state lasers, semiconductor lasers, dye lasers, fiber lasers, excimer lasers, etc.

Furthermore, the laser energy of the laser beams may be continuous wave (CW) or pulsed depending on the needs of an application. Because the present design prevents damage to the liquid nozzle from the laser or in other words eliminates the risks of nozzle damage, much higher peak power of laser energy may be employed than possible with the techniques of the prior art. For high peak-power, pulsed laser lends itself as a practical choice. Hence instant laser tools or off-axis laser beam injection systems or off-axis liquid jet laser tools or liquid jet laser tools 100, 200, 300, 350, 400, 450 and 500 of FIG. 4-12 powered by high peak-power pulsed laser sources for our laser beams 102 and 302 find uses for a wide variety of industry applications.

The present technology may also be employed with gas-assisted laser machining. In such machining applications, an assist gas e.g. oxygen or nitrogen is used as a secondary stream of an inert or non-reactive gas in combination with the primary carbon dioxide (CO2) laser beam during laser cutting operations. Using an assist gas enables one to successfully cut materials at high rates with limited negative effects. The assist gas may also be used for shielding and protection of the water jet per above teachings. As stated, the present technology can easily be used in such gas-assist applications by having the primary source of laser be off-axis or lateral to the cutting or machining tool based on the present design.

The instant multi-laser off-axis laser beam injection systems also preferably employ a control system for coordinating the operation of the multiple laser beams. The control system may be configured to adjust the power, pulse width, timing, and/or repetition rate of each laser beam individually or in unison, optimizing the machining/milling/cutting/drilling process for different materials or processing conditions. For instance, the control system may be in charge of activating/firing and deactivating/stopping various laser wavelengths in the laser beams of the multi-laser embodiment of the present technology.

Alternatively or in addition, the control system may be in charge of activating/firing and deactivating/stopping various continuous wave and pulsed lasers of the multi-laser embodiments of the present technology. Such a control system is implemented by utilizing control systems, electronic design and computer technology techniques in a manner that allows it to be easily configured or programmed according to the needs of a given application.

The present technology provides significant advantages over conventional laser waterjet systems by overcoming limitations related to peak energy and nozzle damage. The instant off-axis liquid jet laser tool or off-axis laser beam injection system allows for higher peak energies while reducing the risk of damage to the nozzle, resulting in improved machining/milling/cutting/drilling efficiency, reduced down-time, and reduced maintenance costs.

For completeness, FIG. 13 is an image or snapshot 550 from an exemplary implementation of an instant liquid jet laser tool. Snapshot 550 shows an off-axis or lateral laser beam 102 being reflected from a bending mirror 106 onto a water jet 116' and undergoing total internal reflection as shown. Laser light thus contained in water jet 116' is then carried/guided downwards towards a workpiece that is not explicitly shown for clarity. Many elements from the prior embodiments are not explicitly shown in black-and-white image/snapshot/photograph 550 of the exemplary implementation of FIG. 13 to avoid clutter and not to detract from the teachings provided herein.

In view of the above teaching, a person skilled in the art will recognize that the methods of present invention can be embodied in many different ways in addition to those described without departing from the principles of the invention. Therefore, the scope of the invention should be judged in view of the appended claims and their legal equivalents.

What is claimed is:

1. A laser tool comprising:

a liquid jet stream ejected from a first nozzle and directed towards a workpiece; and one or more laser beams introduced into said liquid jet stream from respective positions that are off-axis to said first nozzle;

wherein said one or more laser beams undergo total internal reflection in said liquid jet stream to arrive at said workpiece; and wherein said one or more laser beams are introduced into said liquid jet stream downstream from said first nozzle.

2. The laser tool of claim 1 wherein said liquid jet stream consists of water.

3. The laser tool of claim 2 wherein respective angles of incidence of said one or more laser beams are 62.1 degrees, said respective angles of incidence measured with respect to respective imaginary normal lines at points of intersection of said one or more laser beams with said liquid jet stream.

4. The laser tool of claim 1 wherein said one or more laser beams are reflected by respective bending mirrors before being introduced into said liquid jet stream.

5. The laser tool of claim 1 wherein said one or more laser beams are reflected by an annular mirror before being introduced into said liquid jet stream.

6. The laser tool of claim 1 wherein said one or more laser beams are refracted by respective focusing optics before being introduced into said liquid jet stream.

7. The laser tool of claim 1 further comprising a shielding gas ejected from a second nozzle for stabilizing and for extending a collimation length of said liquid jet stream.

8. The laser tool of claim 1 wherein said one or more laser beams are radially distributed around said liquid jet stream.

9. The laser tool of claim 1 further comprising a control system to adjust one or more of a power, a pulse width, and a repetition rate of each of said one or more laser beams.

10. The laser tool of claim 1 wherein said one or more laser beams are produced by respective one or more laser sources.

11. The laser tool of claim 10 wherein said respective one or more laser sources are housed in respective one or more modules, wherein said respective one or more modules have a number that is configured according to an application of said laser tool.

12. A method comprising the steps of:

generating a liquid jet stream from a nozzle;

introducing one or more laser beams into said liquid jet stream from respective positions that are off-axis to said liquid jet stream and cause said one or more laser beams to undergo total internal reflection in said liquid jet stream;

directing said liquid jet stream containing said one or more laser beams to a workpiece;

wherein the step of introducing said one or more laser beams into said liquid jet stream includes introducing said one or more laser beams into said liquid jet stream downstream from said nozzle.

13. The method of claim 12 providing said liquid jet stream to consist of water.

14. The method of claim 13 providing respective angles of incidence of said one or more laser beams to be 62.1 degrees, said respective angles of incidence measured with respect to respective imaginary normal lines at points of intersection of said one or more laser beams with said liquid jet stream.

15. The method of claim 12 reflecting said one or more laser beams by respective bending mirrors before the step of introducing in said one or more laser beams into said liquid jet stream.

16. The method of claim 12 reflecting said one or more laser beams by an annular mirror before the step of introducing said one or more laser beams into said liquid jet stream.

17. The method of claim 12 refracting said one or more laser beams by respective focusing optics before the step of introducing in-said one or more laser beams into said liquid jet stream.

18. The method of claim 12 shielding said liquid jet stream by a shielding gas.

19. The method of claim 12 laterally distributing said one or more laser beams around said liquid jet stream.

20. The method of claim 12 housing said one or more laser beams in respective laser modules whose number is configurable according to an application of said method.

* * * * *